United States Patent
Chuah et al.

(10) Patent No.: US 6,519,254 B1
(45) Date of Patent: Feb. 11, 2003

(54) RSVP-BASED TUNNEL PROTOCOL PROVIDING INTEGRATED SERVICES

(75) Inventors: Mooi Choo Chuah, Eatontown, NJ (US); Muralidharan Sampath Kodialam, Marlboro, NJ (US); Anlu Yan, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/259,170

(22) Filed: Feb. 26, 1999

(51) Int. Cl.$^7$ ............................................. H04Q 11/04

(52) U.S. Cl. .................. 370/389; 370/235; 370/395.21; 370/395.4; 370/465; 709/221; 709/227

(58) Field of Search ................................ 370/235, 254, 370/389, 395.2, 395.21, 395.3, 395.31, 395.4, 395.41, 395.42, 395.43, 395.5, 395.51, 395.52, 465; 709/200, 203, 220, 221, 222, 227, 228

(56) References Cited

U.S. PATENT DOCUMENTS

| | | | |
|---|---|---|---|
| 4,119,796 A | 10/1978 | Jones | 178/69.1 |
| 4,604,582 A | 8/1986 | Strenkowski et al. | 328/55 |
| 5,081,655 A | 1/1992 | Long | 375/119 |
| 5,410,570 A | 4/1995 | Ladha et al. | 375/367 |
| 5,509,037 A | 4/1996 | Buckner et al. | 375/376 |
| 5,509,038 A | 4/1996 | Wicki | 375/371 |
| 5,553,104 A | 9/1996 | Takashi et al. | 375/373 |
| 5,577,075 A | 11/1996 | Cotton et al. | 375/356 |
| 5,592,519 A | 1/1997 | Honaker, Jr. | 375/373 |
| 5,638,410 A | 6/1997 | Kuddes | 375/357 |
| 5,673,415 A | 9/1997 | Nguyen et al. | 395/476 |
| 5,687,202 A | 11/1997 | Eitrheim | 375/376 |
| 5,712,882 A | 1/1998 | Miller | 375/356 |
| 5,903,559 A * | 5/1999 | Acharya et al. | |
| 6,286,052 B1 * | 9/2001 | McCloghrie et al. | |
| 6,182,149 B1 * | 1/2002 | Nessett et al. | |

FOREIGN PATENT DOCUMENTS

JP  02000253071 A  *  9/2000

OTHER PUBLICATIONS

R. Guerin, S. Blake, and S. Herzog, "*Aggregating RSVP–based QoS Requests*", draft–guering–aggreg–rsvp–00, txt, Nov. 1997.

S. Rampal and R. Guerin, "*Flow Grouping For Reducing Reservation Requirements for Guaranteed Delay Service*", draft–rampal–flow–delay–service–01.txt, Jul. 1997.

R. Baden, L. Zhang, S. Berson, S. Herzog, S. Jamin, "*Resource ReSerVation Protocol (RSVP)—Version 1 Functional Specification*", Nework Working Group RFC 2205, Sep. 1997.

S. Shenker, C. Partridge, and R. Guerin, "*Specification of Guaranteed Quality of Service*", Network Working Group, RFC 2212, Sep. 1997.

(List continued on next page.)

*Primary Examiner*—Douglas Olms
*Assistant Examiner*—Shick Hom
(74) *Attorney, Agent, or Firm*—Troutman, Sanders, Mays & Valentine

(57) ABSTRACT

A new RSVP-based tunnel protocol establishes packet tunnels between a tunnel source point (TSP) and a tunnel destination point (TDP) such that guaranteed services to aggregated packet flows is provided. In particular, an end-to-end RSVP session is mapped using a receiver-oriented RSVP type of signaling such that the TDP determines tunnel mapping. As such, this new RSVP-type of protocol is compatible with the receiver-driven nature of RSVP. Subsequent to admitting RSVP sessions, a tunnel tuning procedure dynamically adapts existing RSVP tunnels to traffic conditions in order to improve bandwidth efficiency. This tunnel tuning procedure may result in RSVP tunnel re-assignment of some of the admitted end-to-end sessions.

14 Claims, 12 Drawing Sheets

OTHER PUBLICATIONS

S. Shenker and J. Wroclawski, *"General Characterization Parameters for Integral Service Network Elements"*, Network Working Group RFC 2215, Sep. 1997.

A. Terzis, J. Krawczyk, J. Wroclaski, and L. Zhang, *"RSVP Operations over IP tunnels"*, draft–ietf–rsvp–tunnel–03.txt, Aug. 1998.

J. Wroclawski, *"The Use of RSVP with IETF Integrated Services"*, Network Working Group, RFC 2210, Sep. 1997.

"QoS–adaptation by software agents in the presence of defective reservation mechanisms in the Internet" (1998 IEEE, Jun. 30–Jul. 2, 1998, by De Meer, H., et al.).

"Bandwidth–guaranteed IP tunneling router with RSVP" (1998 IEEE, Feb. 16–18, 1998, by Ito, Y., et al.).

* cited by examiner

AdSpec object for Guaranteed Service (see Fig. 6)

(a) - Per-Service header, service number 2 (Guaranteed);
    (b) - Break bit and Length of per-service data in 32-bit words not including header word;
    (c) - Parameter ID, parameter 133 (Composed $C_{tot}$);
    (d) - Parameter 133 flag byte;
    (e) - Parameter 133 length, 1 word not including header;
    (f) - Parameter ID, parameter 134 (Composed $D_{tot}$);
    (g) - Parameter 134 flag byte;
    (h) - Parameter 134 Length, 1 word not including header;
    (i) - Parameter ID, parameter 135 (Composed $C_{sum}$);
    (j) - Parameter 135 flag byte;
    (k) - Parameter 135 length, 1 word not including header;
    (l) - Parameter ID, parameter 136 (Composed $D_{sum}$);
    (m) - Parameter 136 flag byte;
    (n) - Parameter 136 length, 1 word not including header;

*Fig. 8*

RSVP-BASED TUNNEL PROTOCOL PROVIDING INTEGRATED SERVICES

CROSS-REFERENCE TO RELATED APPLICATIONS

Related subject matter is disclosed in the co-pending, commonly assigned, U.S. Patent application of Chuah, entitled "Providing Quality of Service in Layer Two Tunneling Protocol Networks,"Ser. No. 09/259,200, filed on even date herewith.

FIELD OF THE INVENTION

This invention relates generally to communications and, more particularly, to packet communications systems.

BACKGROUND OF THE INVENTION

In the past, all data traffic using the Internet was treated equally and transported using a "best effort" mechanism. However, over time, the need to support real-time applications over the Internet (e.g., audio/video conferencing tools, gaming applications, etc.) necessitated some form of differentiated services offering. As such, those in the art are defining new protocols for providing quality of service (QoS) to Internet users.

The Resource ReSerVation Protocol (RSVP) is one such protocol. RSVP is a receiver-driven, end-to-end, protocol used by receiving hosts to signal the desired quality-of-service (QoS) to the network elements along a data flow path. In RSVP, the granularity of a QoS request is determined on a per packet flow basis (e.g., see R. Braden, L. Zhang, S. Berson, S. Herzog, S. Jamin, "*Resource ReSerVation Protocol (RSVP)-Version 1 Functional Specification*," RFC 2205).

However, providing a QoS guarantee on a per-packet flow basis creates scalability problems on backbone routers (e.g., see "*Aggregating RSVP-based QoS Requests*," by R. Guerin, S. Blake, S. Herzog., draft-guerin-aggreg-rsvp-00.txt, November 1997). For example, for each packet flow (also referred to herein as a Transaction-Control-Protocol/Internet-Protocol (TCP/IP) session) in a router, there is a reservation state comprising, e.g., TCP/IP source, TCP/IP destination, and TCP/IP protocol number. As such, the necessity for a router to track each individual TCP/IP sessions takes up significant router memory and processing resources. In addition, the end-to-end nature of RSVP makes it unsuitable to be used for reserving virtual pipes through the network.

One solution to the above problem is to aggregate the packet flows and provide RSVP tunnels between two routers as described in "*Aggregating RSVP-based QoS Requests*," by—R. Guerin, S. Blake, S. Herzog., draft-guerin-aggreg-rsvp-00.txt, November 1997; and "*RSVP Operations over IP tunnels*," by A. Terzis, J. Krawczyk, J. Wroclaski, L. Zhang, draft-ietf-rsvp-tunnel-03.txt, August 1998. Now, the RSVP sessions passing through a pair of tunnel end points may provide different services (e.g., guaranteed service (guarantees a worst-case delay) or controlled load service (guarantees a mimimum bandwidth)), the same service with different parameters (e.g., different delay requirement in guaranteed service), or similar services with different policies. Thus there may exist a number of different tunnels between a pair of tunnel end points.

SUMMARY OF THE INVENTION

Although the above-mentioned modified form of RSVP, which aggregates RSVP-based QoS requests, is a solution to the problem, such a modified form of RSVP is no longer purely receiver-oriented. In particular, the information carried in the end-to-end RSVP RESV message (from the receiver to the sender) is not used by the tunnel source point in making the decision on session-to-tunnel mapping. This not only violates the receiver-oriented paradigm of RSVP, but also may result in inefficiency of bandwidth utilization.

Therefore, we have developed a new RSVP-based tunnel protocol that establishes an end-to-end RSVP session over a packet tunnel between a tunnel source point (TSP) and a tunnel destination point (TDP) in a fashion that is consistent with the RSVP receiver-driven paradigm. In particular, an end-to-end RSVP session is mapped using a receiver-oriented RSVP type of signaling such that the TDP determines tunnel mapping. As such, this new RSVP-type of protocol is consistent with the receiver-driven nature of RSVP and therefore requires no changes to the existing RSVP protocol.

In an embodiment of the invention, the RSVP protocol is modified to support receiver-oriented mapping of end-to-end RSVP sessions to tunnels between a TSP and a TDP. In particular, the TDP uses information carried in the end-to-end RSVP RESV message to determine the session-to-tunnel mapping. This mapping is transmitted to the TSP via a new TUNNEL_BINDING object.

In accordance with other features of the invention, when providing guaranteed service, the TDP dynamically configures tunnels to the TSP, and performs tunnel tuning for established tunnels. The latter feature permits dynamically adapting existing tunnels to traffic conditions in order to improve bandwidth efficiency. The tunnel tuning procedure may result in tunnel re-assignment of some of the admitted end-to-end RSVP sessions.

BRIEF DESCRIPTION OF THE DRAWINGS

FIGS. 7–8 shows an RSVP AdSpec object for Guaranteed Service;

DETAILED DESCRIPTION

The description below is generally broken into a number of parts. The first part describes a brief high-level background followed by an overview of the new RSVP-based tunnel protocol. Following the overview section are more detailed sections covering tunnel management, receiver-driven tunnel assignment/admission control, tunnel configuration, and tunnel tuning.

Overview

Figure 1:
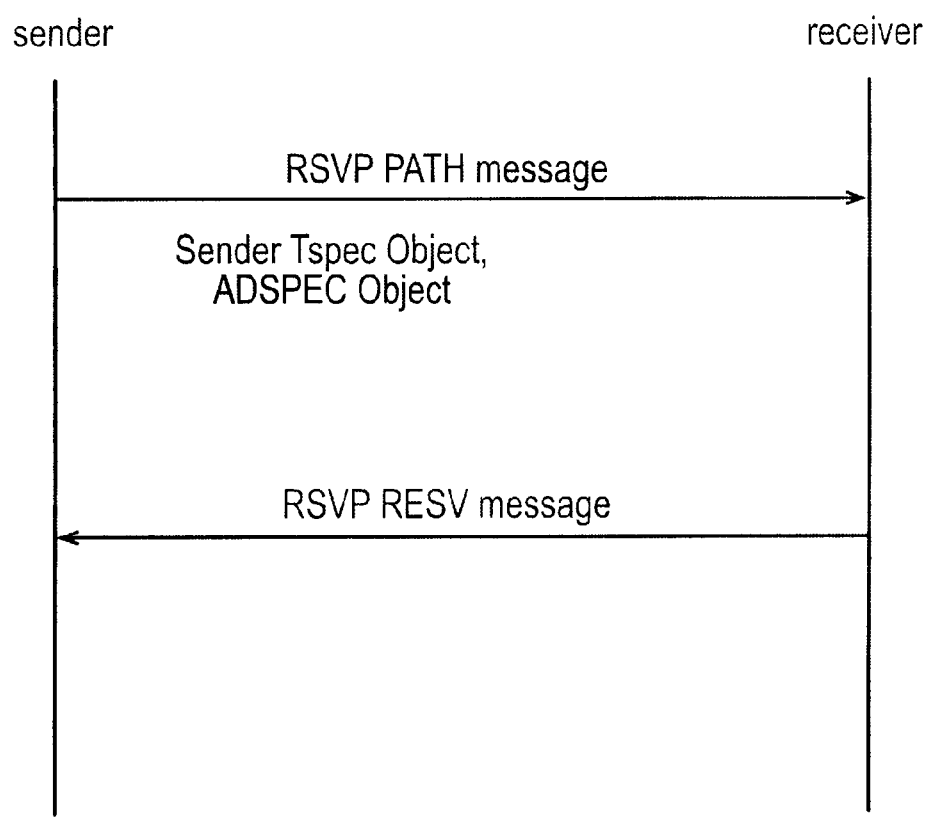
FIGS. 1–2 shows portions of prior art end-to-end RSVP message transactions.

As background, a portion of an illustrative end-to-end RSVP message transaction is shown in FIG. 1, for participating in a RSVP session with guaranteed service. A sender sends an RSVP PATH message to a receiver (identified by a respective unicast, or multicast, IP address). Attached to the RSVP PATH message are the Sender TSpec object and the ADSPEC object. The Sender Tspec object specifies the flow characteristics the sender is capable of sending, and the ADSPEC object contains the parameters subject to the modifications by the routers along the path to the receiver. When a receiver makes a reservation, it computes the amount of bandwidth it needs according to its delay requirement and the parameters contained in the ADSPEC object (which as mentioned, may have been modified by the above-mentioned routers (not shown)). The receiver then sends a RSVP RESV message upstream to reserve the bandwidth along the path traversed by the RSVP PATH message. The details of these operations are specified in the above-mentioned "*Specification of Guaranteed Quality of Service*," by S. Shenker, C. Partridge and R. Guerin, RFC 2212; and—"*The Use of RSVP with IETF Integrated Services*," by J. Wroclawski, RFC 2210.

Figure 2:
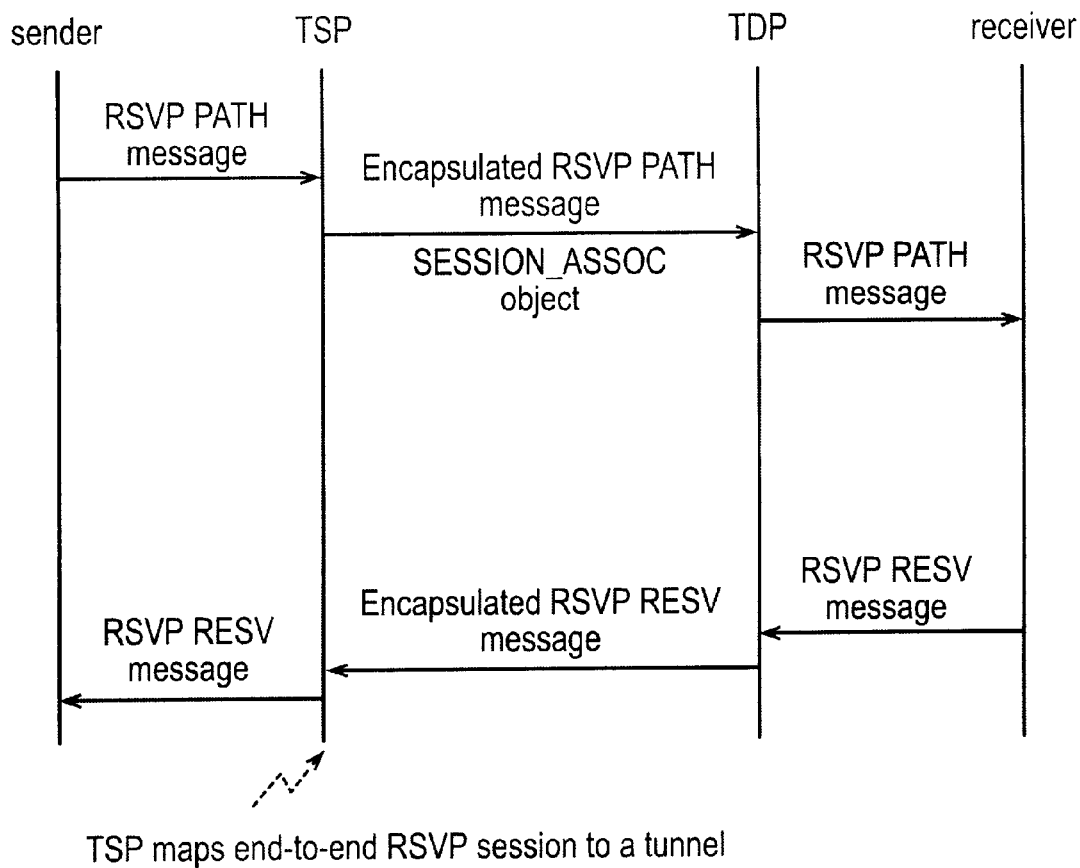

As noted above, it is possible to carry end-to-end RSVP session over an RSVP tunnel. The latter is just an RSVP session with the TSP as the sender and the TDP as the receiver. When an end-to-end RSVP session passes between the TSP and the TDP, the TSP maps the end-to-end session to one of m RSVP tunnels between them. The set of m tunnels is pre-established between the TSP and the TDP by, e.g., using a policing server or Authentication Authorization and Accounting (AAA) server (not shown), as known in the art. As a result, instead of one RSVP session per flow between TSP and TDP, multiple flows may be aggregated into a single RSVP tunnel, thus the number of states kept on the intermediate routers can be greatly reduced. When the data for an end-to-end flow arrives at a TSP, it is encapsulated so that the intermediate routers do not differentiate different flows that belong to the same tunnel. To distinguish different RSVP tunnels, IP-in-UDP (User Datagram Protocol) encapsulation is used as described in the above-mentioned article "*RSVP Operations over IP tunnels*," by Terzis et al. In this encapsulation scheme, (for what is described in this article as Type 2 tunnels) the UDP destination port numbers serve as the tunnel identifiers. After being aggregated into a tunnel, an individual flow has to share bandwidth with other flows in the same tunnel. Therefore the tunnel has to be treated as a pure delay network element when it comes to update the ADSPEC of the end-to-end flow, as described in the above-mentioned article "*Aggregating RSVP-based QoS Requests*," by Guerin et al. A portion of a prior art message transaction for establishing an end-to-end RSVP session over a tunnel is shown in FIG. 2. As noted earlier, the above-mentioned modified form of RSVP (and illustrated in FIG. 2) is not consistent with the RSVP receiver-driven paradigm since the TSP determines tunnel mapping and mapping information for an end-to-end RSVP session without any information about the receiver.

Therefore, we have developed a new RSVP-based tunnel protocol that establishes an end-to-end RSVP session over a packet tunnel between a TSP and a TDP in a fashion that is consistent with the RSVP receiver-driven paradigm. In particular, an end-to-end RSVP session is mapped using a receiver-oriented RSVP type of signaling such that the TDP determines tunnel mapping using the information in the end-to-end RSVP message.

Figure 3:
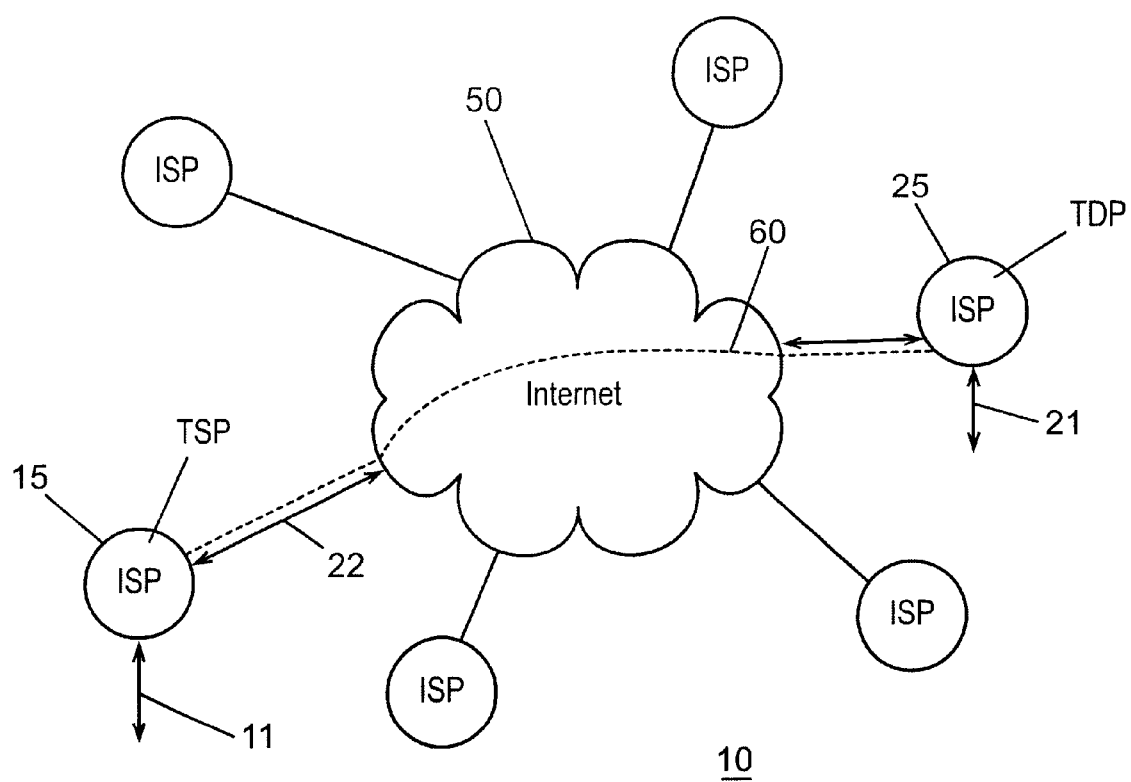
FIG. 3 shows a network in accordance with the principles of the invention.

An illustrative network, 10, in accordance with the principles of the invention, is shown in FIG. 3. Other than the inventive concept, the elements shown in FIG. 3 are well known and will not be described in detail. For example, although shown as a single block element, Internet Service Provider (ISP) 15 includes stored-program-control processors, memory, and routers/servers (e.g., point-of-presence (POP) router, network access servers (NAS), etc.) (not shown). Network 10 includes a plurality of ISPs as represented by ISP 15 and ISP 25 coupled via Internet 50. The latter is representative of any Internet-Protocol (IP) based network infrastructure and includes other components (not shown) such as routers, etc., for communicating IP packets between packet endpoints. Likewise, the solid lines between elements of network 10 are representative of well-known communications facilities between the respective endpoints, e.g., the connection between ISP 15 and Internet 50, illustrated by line 22, is supported by asynchronous transfer mode (ATM) over a synchronous optical network (SONET), etc. Similarly, lines 11 and 21 are representative of any number and type of communications facilities, e.g., multiple T1/E1 lines (for each direction), etc., for entering and exiting network 10 via ISP 15 and ISP 25, respectively. (Senders and receivers for this traffic are not shown for simplicity.) Further, it is assumed that the reader is familiar with the above-mentioned RSVP protocol. Although RSVP supports integrated services, e.g., either a guaranteed service or a controlled load service, the description herein illustratively uses the guaranteed service. It is also assumed for the purposes of this description that the operation of ISP 15 and ISP 25 are complementary and that ISP 15 is a TSP and that ISP 25 is a TDP. As such, this description assumes that the TSP and the TDP are fixed and aware of each other (e.g., they know each other's address). In addition, the TSP knows which traffic flows have to be routed through the TDP. In this context, and as described further below, RSVP tunnel(s) 60 (dashed line) are setup to connect ISP 15 to ISP 25 and the traffic that needs to be routed through RSVP tunnel(s) 60 is identified by the destination subnet address of the corresponding traffic.

For the remainder of this description, a "TUNNEL_" prefix is added to the RSVP messages relating to the tunnel in order to distinguish the RSVP messages for the tunnel from those for the end-to-end flows. Further, it is assumed that when the data for an end-to-end flow arrives at a TSP, a Type 2 tunnel is used for encapsulation as described in the above-mentioned article "*RSVP Operations over IP tunnels*," by Terzis et al. Similarly, each tunnel is treated as a pure delay network element as described in the above-mentioned article "*Aggregating RSVP-based QoS Requests*," by Guerin et al.

Figure 4:
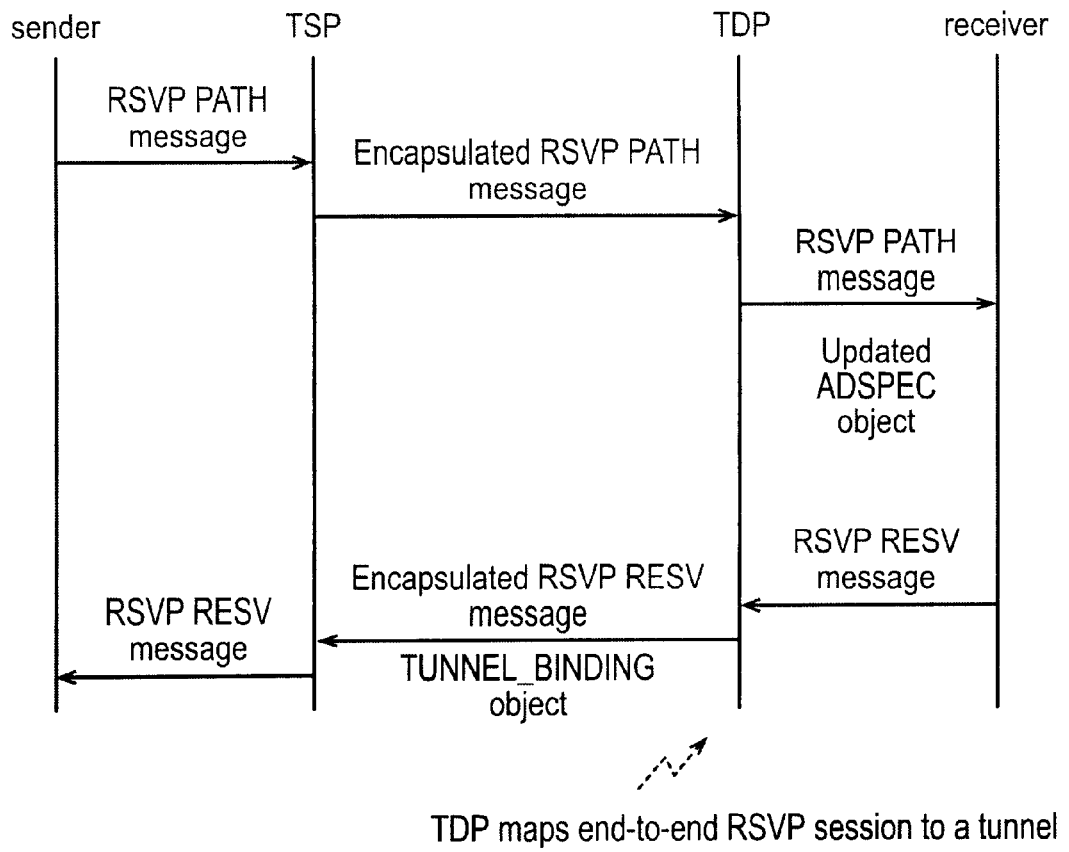
FIG. 4 shows a portion of an end-to-end RSVP-based message transaction in accordance with the principles of the invention.
Figure 5:
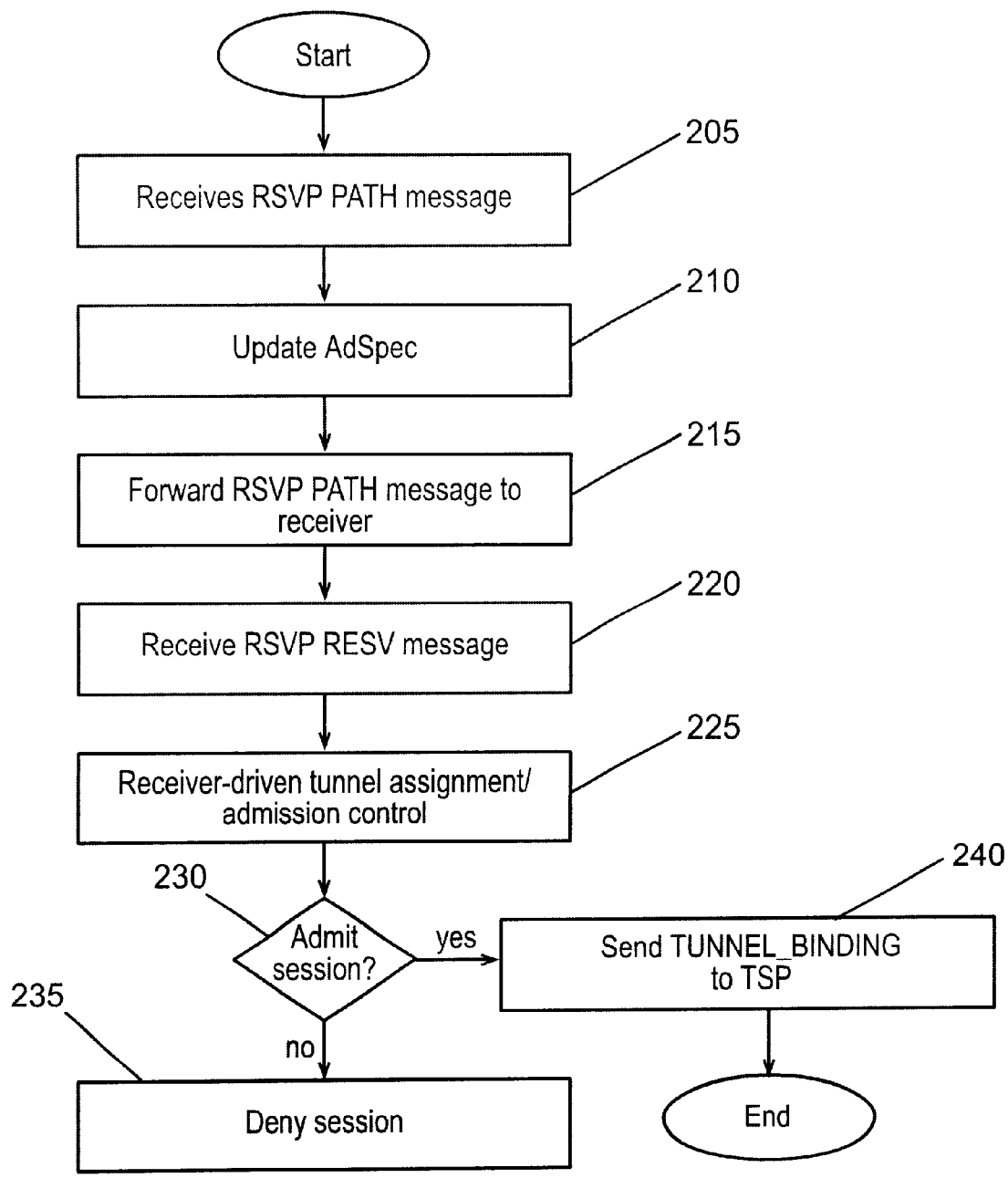
FIG. 5 shows an illustrative flow chart in accordance with the principles of the invention.

Initially, it is assumed that a set of m tunnels, 60, exists between the TSP and the TDP. In accordance with the invention, a portion of an illustrative RSVP end-to-end message transaction is shown in FIG. 4. Reference can also be made to FIG. 5, which shows an illustrative flow chart in accordance with the principles of the invention for use in the TDP. It is presumed that the TDP, is suitably programmed to carry out the below-described methods using conventional programming techniques, which, as such, will not be described herein. Since RSVP is a receiver-driven protocol, when a new end-to-end RSVP PATH message reaches the TSP, the TSP simply encapsulates the end-to-end RSVP PATH message and sends it to the TDP. (This assumes that the tunnels are not statically pre-configured a priori.) Upon receiving the encapsulated end-to-end RSVP PATH message (step 205 of FIG. 5), the TDP decapsulates it, updates the ADSPEC (step 210 of FIG. 5), and forwards it to a corresponding receiver (not shown) in accordance with RSVP end-to-end signaling (step 215 of FIG. 5). After the receiver (not shown) receives the RSVP PATH message, the receiver computes the parameters needed for this RSVP session (as in the prior art) and sends back the end-to-end RSVP RESV message. When the TDP receives this RSVP RESV message (step 220 of FIG. 5), the TDP, in accordance with the invention, determines the appropriate RSVP tunnel for this end-to-end RSVP session by executing a receiver-driven tunnel assignment/admission control procedure (step 225 of FIG. 5, described further below) and, if admitted (step 230 of FIG. 5) forms a TUNNEL_BINDING object for notifying the TSP of the session to tunnel binding. (If not admitted, the session is denied in step 235 of FIG. 5.) The TDP then encapsulates the end-to-end RSVP RESV message (along with the attached TUNNEL_BINDING object) and sends it to the TSP (step 240 of FIG. 5), which decapsulates it. In response to the received TUNNEL_BINDING object, the TSP uses the tunnel assigned by the TDP for the end-to-end RSVP session. The TSP forwards the remaining portion of the RSVP RESV message upstream to the sender (not shown). As a result, this modified signaling enables the TDP to assign a tunnel to an end-to-end RSVP session based on the parameters of the tunnels and the end-to-end RESV messages.

Figure 6:
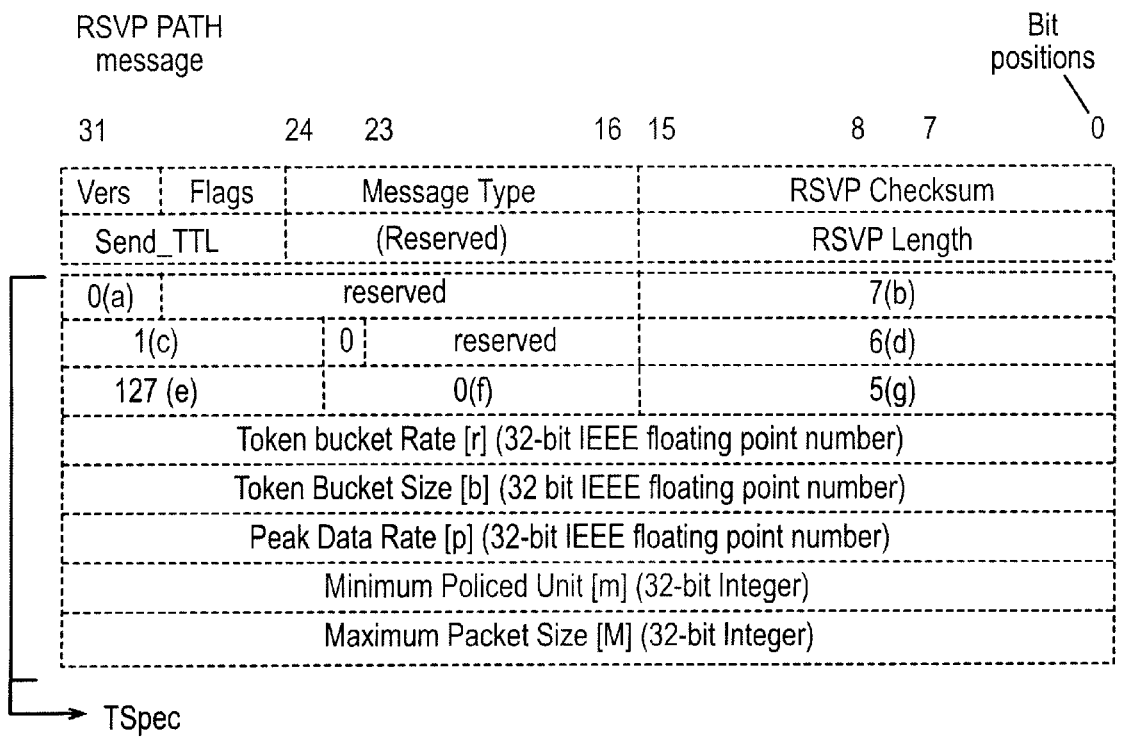
FIG. 6 shows an RSVP PATH Message format comprising a TSpec.
Figure 7:
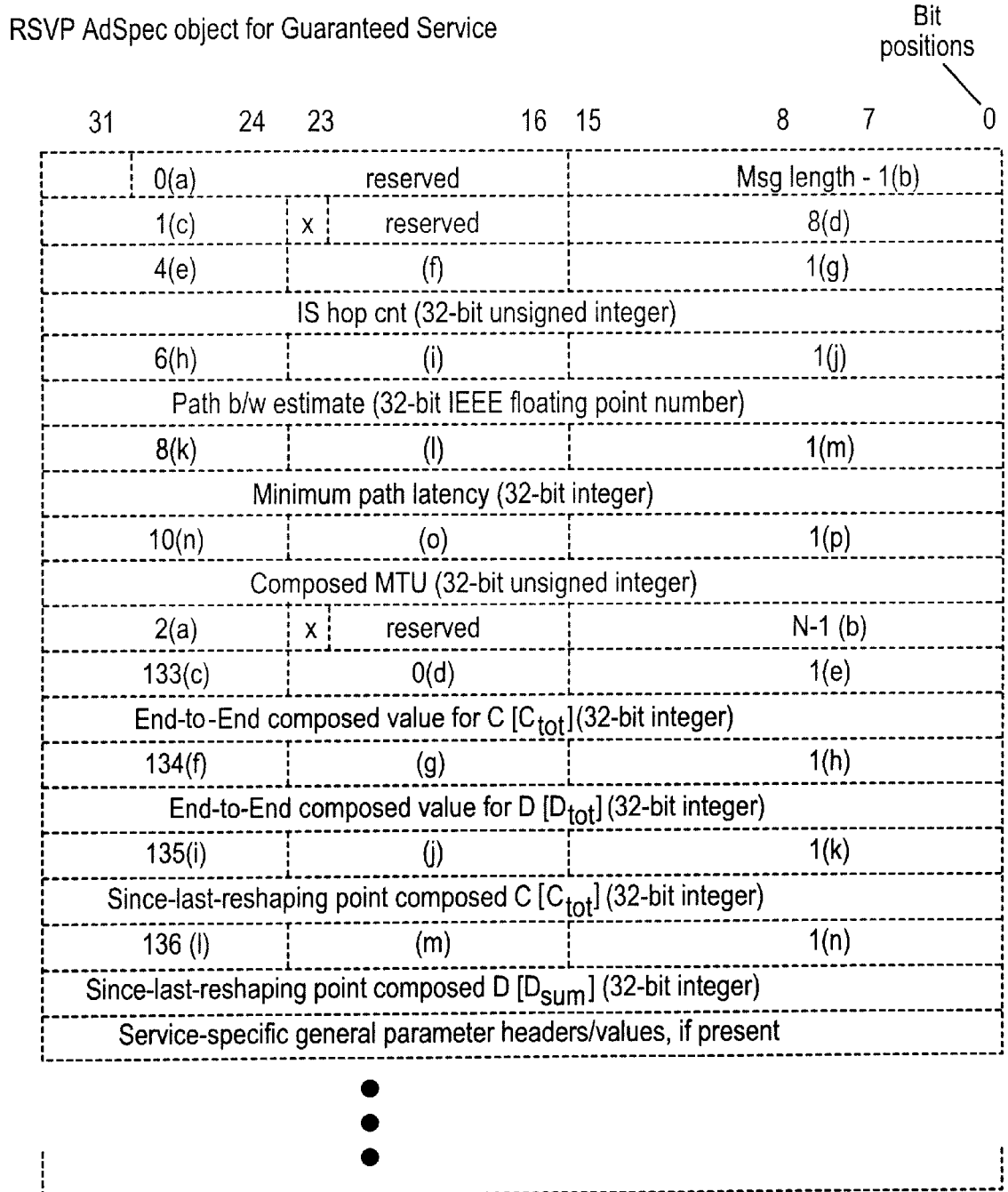
Figure 9:
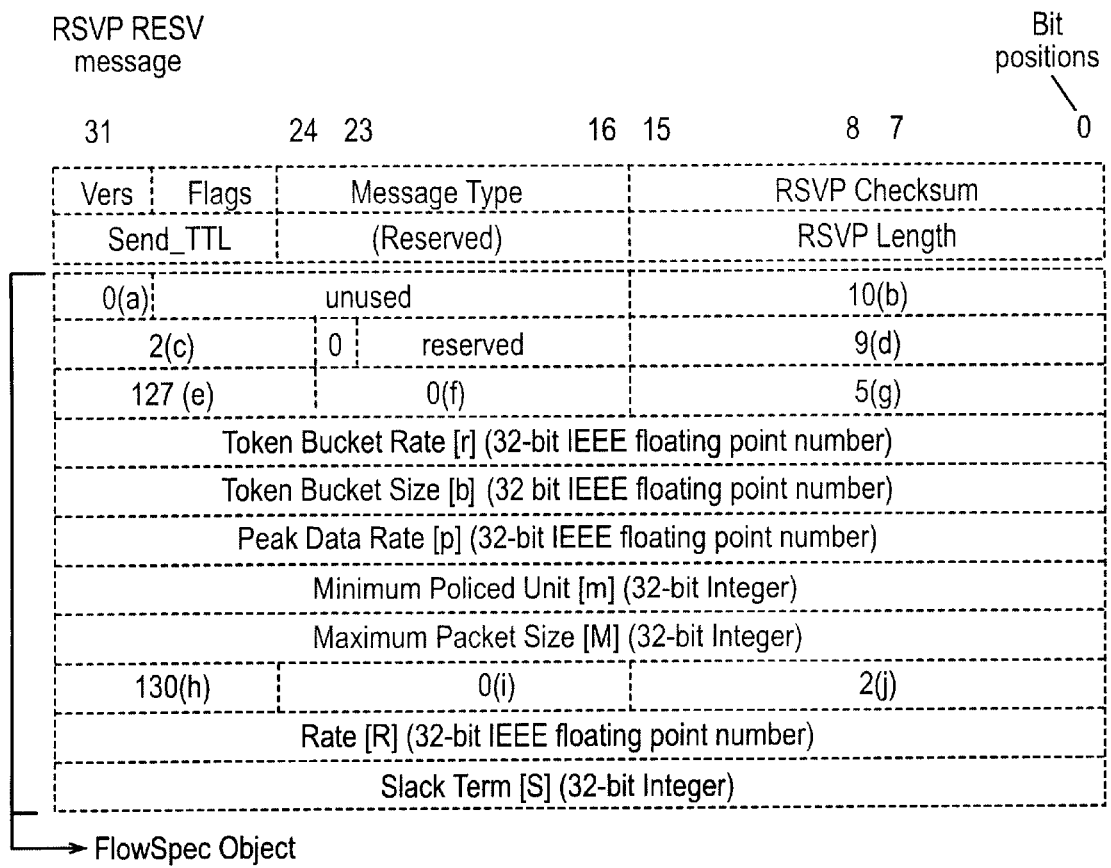
FIG. 9 shows an RSVP RESV Message format comprising a Session Object and a FlowSpec Object.
Figure 10:
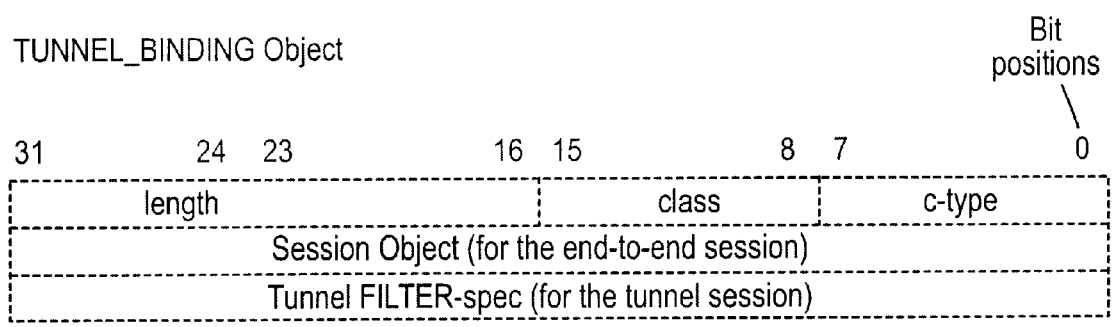
FIG. 10 shows an illustrative TUNNEL_BINDING Object in accordance with the principles of the invention.

With respect to the above-mentioned messages, an RSVP PATH message format is shown in FIG. 6. An RSVP ADSPEC object is shown in FIGS. 7–8. An RSVP RESV message is shown in FIG. 9 along with Session Object and FlowSpec Object. (It should be noted that, other than the inventive concept, these formats are as defined in RSVP.) In accordance with the invention, an illustrative format for the TUNNEL_BINDING object is shown in FIG. 10. (It should be observed that the TUNNEL_BINDING object format is similar to the session object described in the above-mentioned article "RSVP Operations over IP tunnels," by Terzis et al.)

When the TSP subsequently receives data traffic, it encapsulates the packets with the appropriate IP-in-UDP header based on the session-to-tunnel binding. The TSP must also mark data traffic from each flow that do not conform to their individual TSPEC, which means that TSP needs to have a policing function for each flow as known in the art.

Figure 11:
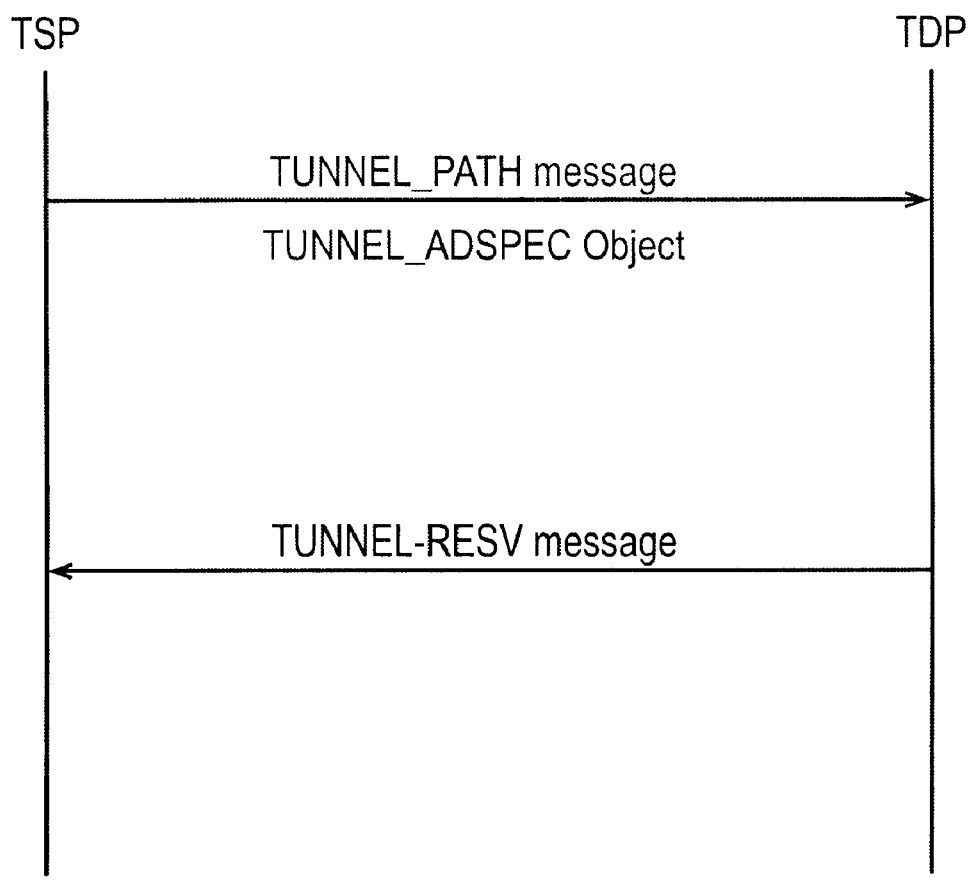
FIG. 11 shows a portion of a tunnel message transaction.

It should be noted that the tunnels to not have to be a priori configured as initially assumed. In particular, the TDP can dynamically configure tunnels to the TSP (described further below). This type of message transaction is shown in FIG. 11. (It should be noted that, other than the ability to dynamically configure tunnels in the TDP, this type of message flow transaction is the same as in the prior art. In other words, even for pre-configured tunnels, this type of message flow occurs.) With respect to FIG. 11, to establish an RSVP tunnel, the TSP acts as a sender, or data source, and sends a TUNNEL_PATH message to the unicast address of the TDP. Attached to the TUNNEL_PATH message is a TUNNEL_ADSPEC object. In accordance with a feature of the invention (described below), the TDP now makes decisions on how many tunnels to establish and how to allocate resources among them based on the parameters contained in the received TUNNEL_ADSPEC object. The TDP then sends a TUNNEL_RESV message to the TSP to establish the tunnel.

Each tunnel set up as described above may provide either controlled load service or guaranteed service as defined in the article "General Characterization Parameters for Integrated Service Network Elements," by S. Shenker and J. Wroclawski, RFC 2215. In the following sections, additional algorithms are described for managing tunnels providing guaranteed services.

Tunnel Management for Guaranteed Service

Before continuing with a description of the receiver-driven assignment/admission control, tunnel configuration, and tunnel tuning procedures performed in the TDP, the following information on tunnels is provided.

Different end-to-end RSVP sessions may have different delay requirements. Therefore it is advantageous to have different delay guarantees associated with each tunnel. Suppose there are n tunnels between the TSP and the TDP, with delay guarantees of $d_1^T < d_2^T < \ldots < d_n^T$ for each tunnel, respectively. Then, an end-to-end RSVP session that requires a delay guarantee d between the TSP and the TDP will be mapped to tunnel i if $d_i^T < d < d_{i+1}^T$, assuming tunnel i has enough capacity.

As such, a Tspec for tunnel i is represented by a vector $TS_i^T = (b_i^T, r_i^T, p_i^T, M_i^T, m_i^T)$, where $b_i^T$ is the burst size, $r_i^T$ is the average rate, $p_i^T$ is the peak rate, $M_i^T$ is the tunnel message transfer unit (MTU) and $m_i^T$ is the accounting unit (e.g., see the above-mentioned article "General Characterization Parameters for Integrated Service Network Elements," by Shenker et al.). In general, the C and D values (see the above-mentioned article "Specification of Guaranteed Quality of Service," by S. Shenker et al.) associated with tunnel i, denoted by $C_{tot,i}^T$ and $D_{tot,i}^T$ are functions of $TS_i^T$ and hence may be different for each tunnel. (It should be noted that in the guaranteed service case $D_{tot}$ is updated but not $C_{tot}$.)

Without loss of generality, consider two tunnels that guarantee delay $d_1^T$ and $d_2^T$, respectively. The delay guarantee, d, is computed by:

$$d = \frac{b+C}{R} + D, \quad (1)$$

where b is the burst size, R is the reserved bandwidth, and C and D are as defined in the above-mentioned article "Specification of Guaranteed Quality of Service," by Shenker et al.

Each tunnel will require bandwidth:

$$R_i^T = (b_i^T + C_{tot,i}^T)/(d_i^T - D_{tot,i}^T), \quad (2)$$

where i=1, 2. If the two tunnels are grouped together, then there must be a guarantee delay $d_1^T$ and the new TSpec is $TS_g^T = (b_1^T + b_2^T, r_1^T + r_2^T, p_1^T + p_2^T, \max\{M_1^T, M_2^T\}, \min\{m_1^T, m_2^T\})$. Correspondingly, this tunnel will have $C_{tot,g}^T$ and $D_{tot,g}^T$. and it requires bandwidth:

$$R_g^T = (b_1^T + b_2^T + C_{tot,g}^T)/(d_1^T - D_{tot,g}^T). \quad (3)$$

Obviously, if $R_g^T \leq R_1^T + R_2^T$ then it is preferable to set up one tunnel rather than two.

Since any intermediate routers update the $C_{tot}$ and $D_{tot}$ in TUNNEL_ADSPEC based partially on the TUNNEL_TSpec sent from the TSP, if the TDP decides to use a different TUNNEL_TSpec, then $C_{tot}^T = f(TUNNEL\_TSpec)$ and $D_{tot}^T = h(TUNNEL\_TSpec)$ may also be different, where f and h are functions unknown to TSP and TDP. As a result, the TDP in general needs to know the function f and h in order to compute $R^T$ correctly.

To find out the functions f and h, The TSP can send out a number of TUNNEL_PATH messages with different TUNNEL_TSPECs. Upon receiving these TUNNEL_TSPECs along with the associated TUNNEL_ADSPECs, the TDP can then estimate f and h by interpolation. Those TUNNEL_PATH messages not used for tunnel reservation will time out.

In reality, f and h are not likely to be complicated functions. For example, if the intermediate routers all implement WFQ (weighted fair queuing) then $C_{tot}^T=(k-1)M^T$ and $D_{tot}^T=\Sigma_j^k M^T/C_j$, where k is the number of hops in the tunnel and $C_j$ is the link speed of each hop. In this case, the TSP sends TUNNEL_PATH messages with different $M^T$ values while keeping all the other components in TUNNEL_TSPEC fixed. The TDP then collects a set of data ($M_j^T, C_j^T, D_j^T$) from the TUNNEL_TSPECS and TUNNEL_ADSPECs and fits them to linear functions of $M^T$ which are the upper bounds of $C_j^T$ and $D_j^T$, respectively.

When multiple paths exist between the TSP and the TDP, the $C_{tot}^T$ and $D_{tot}^T$ values may be quite different along different paths (otherwise there is no need to distinguish these paths). In such cases, the TDP can first classify the data into clusters and then proceed with the interpolation. Alternatively, the TDP can also get a single upper bound of $C^T$ and $D^T$ for all the clusters but that may be too conservative.

To simplify the tunnel management, the tunnel MTU is always used as $M^T$ for all the tunnels. It is further assumed that both $C^T$ and $D^T$ are constants for a given $M^T$. This is consistent with the exported values from WFQ routers. Evidently, RSVP also implicitly makes this assumption for even though a receiver may specify a different TSpec than what it receives from the sender, the receiver still uses the same C and D values associated with the TSpec in the PATH message to compute the bandwidth requirement. If this assumption does not hold, the interpolation method outlined above can be used and the complexity of the computation will depend on the form of f and h.

Under the above assumption:

$$R_1^T+R_2^T=(b_1^T+C_{tot}^T)/(d_1^T-D_{tot}^T)+(b_2^T+C_{tot}^T)/(d_2^T-D_{tot}^T) \quad (4)$$

and if the two tunnels are merged into one, the required bandwidth is $$R_g^T=(b_1^T+b_2^T+C_{tot}^T)/(d_1^T-D_{tot}^T) \quad (5)$$

Hence $$R_g^T-(R_1^T+R_2^T)=\frac{b_2^T}{d_1^T-D_{tot}^T}-\frac{b_2^T+C_{tot}^T}{d_2^T-D_{tot}^T}. \quad (6)$$

If $b_2^T$ is fixed, this is a monotonically increasing function with respect to $d_2$, and when $$d_2^T < d_1^T + (d_1^T - D_{tot}^T)\frac{C_{tot}^T}{b_2^T}, \text{ then} \quad (7)$$

$$R_g^T < R_1^T + R_2^T. \quad (8)$$

Namely it will save bandwidth by merging the two tunnels into one. It should be noted that when $d_2^T=d_1^T$, $R_g^T-(R_1^T+R_2^T)=-C_{tot}^T/d_1^T-D_{tot}^T<0$. In other words, it always saves bandwidth by bundling sessions with the same delay requirement into one tunnel. This special case was observed in S. Rampal and R. Guerin, "*Flow Grouping for Reducing Reservation Requirements for Guaranteed Delay Service*," draft-rampal-flow-delay-service-01.txt, July 1997.

Let $d_2^T \to \infty$ in equation (6), then:

$$R_g^T-(R_1^T+R_2^T)=\frac{b_2^T}{d_1^T-D_{tot}^T}>0. \quad (9)$$

This is another extreme case which shows that when $d_2^T$ is large enough, it will be more bandwidth efficient to keep the two tunnels separate.

It can be observed from the above discussion that the delay may be a good index to use when deciding upon how to partition the tunnels to used bandwidth efficiently. This is indeed the case.

Suppose there are n RSVP sessions with parameter set ($b_i$, $R_i$, $d_i$), i=1, . . . , n, and assume that these sessions have been sorted by $d_i$. If a tunnel is set up to guarantee delay $d^T$, no session with a delay requirement less than $d^T$ can fit in this tunnel. On the other hand, it is not bandwidth efficient to put a session i with a delay requirement larger than $d^T$ into a tunnel with delay guarantee $d^{T'}<d^T$. This is evident because the additional bandwidth needed for adding this session to a tunnel with delay guarantee $d^T$ is $\Delta R=b_i/(d^T-D_{tot}^T)$, and the additional bandwidth for adding this session to a tunnel with delay guarantee $d^{T'}$ is $\Delta R'=b_i/(d^{T'}-D_{tot}^T)>\Delta R$.

This shows that for a given set of sessions, if tunnels are set up to provide various delay guarantees $d_1^T<d_2^T< \ldots <d_n^T$, it is bandwidth efficient to put a session with delay requirement $d_j^T \leq d_i < d_{j+1}^T$ into tunnel j. Therefore, if the tunnels are to be pre-configured based on given RSVP session statistics, the RSVP sessions should be sorted by $d_i$ first (described further below).

Since the TSP in general has no knowledge of what kind of TSpec the tunnels can support, the TSP simply sends what it knows as the largest TSpec possible. Specifically, the TSP sends $b^T$ to be its buffer size, $p^T$ to be the sum of the incoming link speed (or infinity), $r^T$ to be the outgoing link speed, $M^T$ to be the maximum packet size supported by the outgoing interface, and $m^T$ to be the smallest accounting unit the TSP supports.

The TSP also does not know the appropriate number of tunnels to set up, so during the tunnel setup period the TSP sends at least as many TUNNEL_PATH messages as the number of tunnels the TSP can support. The excess TUNNEL_PATH messages can be used to support parameter interpolation if necessary and will be cleared from the routers when no corresponding TUNNEL_RESV messages are received within a time-out interval.

The appropriate number of tunnels and the values of TUNNEL_TSPEC are computed by the TDP. The TDP then sends TUNNEL_RESV messages along with the TUNNEL_TSPEC in the TUNNEL_FLOWSPEC to the TSP. The TUNNEL_RESV message should use FF reservation style with Filterspec specifying IP address of the TSP and UDP destination port number.

Receiver-Driven Tunnel Assignment/Admission Control

RSVP is a receiver-driven protocol. Based on the delay requirement of the application and the parameters received in TSpec and ADSPEC in the end-to-end RSVP PATH message, the receiver calculates the desired bandwidth R, the slack term S, and the desired TSpec, and sends them upstream in the FLOWSPEC.

In accordance with the invention, after receiving the encapsulated RSVP PATH message from the TSP, the TDP decapsulates it and modifies the ADSPEC. The TDP always advertises C=0 and D=$d_1^T$ (the smallest delay) for the tunnel (even if the tunnel has no more free capacity). When the TDP receives a RESV message back from the receiver, the TDP can optionally use part of the slack term $0 \leq S_0 \leq S$ and maps this session to any tunnel i which guarantees a delay less than $d_1^T+S_0$. The TDP then reduces S by $d_i^T-d_1^T$. If none of the eligible tunnels have sufficient capacity for this new session, it is still possible to map this session to another tunnel without violating the delay guarantee. This will be elaborated below.

Advertising the single smallest possible delay value $d_1^T$ for the tunnel makes the protocol simple and scalable—the TDP does not need to know the various different delay guarantee requirements of the receiver, the TDP simply advertises the best it can do. Note that due to the receiver-driven nature of the RSVP protocol, the TDP does not even know the delay requirement of the RSVP session when it processes the ADSPEC from the sender.

If the receiver can tolerate more delay, then one option is to put the excessive value in the slack term S. In this case, the TDP can use the excessive value to map the session to a tunnel that has a looser delay guarantee as mentioned above. The other option of the receiver is to simply reserve a smaller amount of bandwidth. If most of the receivers choose the second option, then the tunnel that offers the smallest delay will need a larger share of the bandwidth. This issue is discussed further below.

From the above description, one can see that while the tunnels are established prior to the RSVP session requests, the TDP attempts to make the best use of the tunnels (i.e. mapping sessions to tunnels) by using the RESV and TSpec message from the receiver.

For each RSVP tunnel, the TDP maintains a set of parameters $(b^T, R^T, d^T, p^T, M^T)$. The TDP admits a new RSVP session to a tunnel (steps 225 and 230 of FIG. 5), if all the following conditions hold true:

$$\Sigma_i b_i \leq b^T, \quad (10)$$

$$\Sigma_i r_i \leq R^T, \quad (11)$$

$$\Sigma_i p_i \leq p^T, \quad (12)$$

$$\text{Max}_i M_i \leq M^T, \text{ and} \quad (13)$$

$$\frac{\sum_i b_i + C_{tot}^T}{d^T - D_{tot}^T} \leq R^T. \quad (14)$$

Note that since $p^T$ is set to be the sum of the incoming link speed of the tunnel, and $M^T$ to set to be the MTU of the tunnel, the conditions represented by equations (12) and (13) should always be true.

Tunnel Configuration

Suppose that prior to establishing any tunnel, statistics exist for RSVP sessions going through the TSP and the TDP. Specifically, for each session $i=1, \ldots, N$, $(b_i, R_i, S_i)$ has been recorded, where $b_i$ is the maximum burst size, $R_i$ is the reserved bandwidth, and $S_i$ is the slack term. Assuming such statistics represent a typical traffic pattern, it is desirable to find a way to configure the tunnels to efficiently utilize the bandwidth. Suppose it is decided that out of $S_i$, $S_i^0$ is to be used by the tunnel. The traffic profile based tunnel configuration algorithm (Tunnel_Config (b, R, $S^0$, N)) is:

1. Let $$d_i = \frac{b_i + C_{tot}^T}{R_i} + D_{tot}^T.$$

2. Sort vectors $(R_i, b_i, d_i + S_i^0)$ using $d_i + S_i^0$ as the key, where $i=1, \ldots, N$.

3. For each $n=1, \ldots, N$, compute:

$$R_{1,n}^g = \frac{\sum_{i=1}^{n} b_i + C_{tot}^T}{d_1 + S_1^0 - D_{tot}^T} \text{ and } R_{2,n}^g = \frac{\sum_{i=n+1}^{N} b_i + C_{tot}^T}{d_{n+1} + S_{n+1}^0 - D_{tot}^T}.$$

4. Find $n_0 = \arg \min\{R_{1,n_0}^g + R_{2,n_0}^g\}$
5. If $n_0=1$, a tunnel is configured with $d^T = d_1^0 + S_1^0$, $b^T = \Sigma_i^N b_i$, and
   $R^T = (b^T + C_{tot}^T)/(d^T - D_{tot}^T)$ and Tunnel_Config Stops.
6. If $n_0 > 1$, run
   Tunnel_Config $((b_1, \ldots, b_{n_0-1}), (R_1, \ldots, R_{n_0-1}), (S_1^0, \ldots, S_{n_0-1}^0), n_0-1)$ and
   Tunnel_Config $((b_{n_0}, \ldots, b_N), (R_{n_0}, \ldots, R_N), (S_{n_0}^0, \ldots, S_N^0) N-n_0-1)$.

The tunnel configuration process start by computing d, in step 1, which is the delay the session i would experience if a tunnel is created for this session alone. Then the vector $(R_i, b_i, d_i+S_i^0)$ is sorted using $d_i+S_i^0$ as the key in step 2. The sessions are then partitioned into two groups and the bandwidth for each group is calculated in step 3. The partition that results in the least amount of total bandwidth is then fixed, and the process is run recursively for each part of the partition in steps 4, 5, and 6. When making an additional partition does not further reduce the bandwidth requirement, the recursion stops.

Tunnel Tuning

The presence of tunnels on the path of RSVP sessions is transparent both to the senders and the receivers. As described earlier, the TDP always advertises the most stringent delay guarantee it can provide. As a consequence, what a receiver sees is the smallest $D_{tot}$ value along the path. In cases when the application at the receiver can tolerate more delay, it is up to the receiver to decide whether to put in a slack term or simply ask for less bandwidth in the reservation message.

As mentioned above, if the TDP sees a slack term S>0, the TDP can optionally use part of it. On the other hand, if S=0, the TDP can do nothing but put the RSVP session in the tunnel with the most stringent delay guarantee. As a result, this tunnel is likely to be filled much more quickly than the others. In general, since the tunnels are pre-partitioned, the traffic pattern is unlikely to match parameters based on which the tunnels are partitioned. In such cases, the tunnel parameters can be dynamically adjusted to cater to the traffic pattern.

The delay guarantee provided by a tunnel is a function of the burst size $b^T$ and bandwidth $R^T$ as shown in the above-mentioned article *"Aggregating RSVP-based QoS Requests,"* by Guerin et al. Note that if a session needs a delay guarantee d, only when all the tunnels with delay guarantee less than d have been filled is it necessary to use a tunnel j with $d_j^T > d$. In other words, $d_j^T$ should be adjusted so that $d_{j,new}^T < d_{j,old}^T$. This implies that one either has to increase the bandwidth for an existing tunnel, or decrease the burst size permitted at a tunnel, with $d^T > d$. In either case, a TUNNEL_FLOWSPEC is sent from the TDP to the TSP to announce the tunnel parameter change.

While the request of increasing tunnel bandwidth $R_j^T$ may fail depending on the available bandwidth, the request of decreasing burst size $b_j^T$ shall not. Therefore, decreasing burst size is a preferable way of adjusting the tunnel dynamically.

For a tunnel to provide a new delay guarantee $d_{new}^T$, the new allowable burst size is:

$$b_{new}^T = (d_{new}^T - D_{tot}^T) * R^T - C_{tot}^T. \quad (15)$$

Before making the decision to request a decrease in burst size, the TDP must first verify that the admission criteria (describe above) would still hold for the new tunnel.

A tunnel adjustment can also be made temporary. Namely, after the sessions with small delay requirement terminate, a tunnel can be changed back to its original parameters by sending a TUNNEL_FLOWSPEC from the TDP to the TSP.

While dynamic tunnel adjustment helps to change the tunnel parameters to fit the need of the current traffic, it also may result in tunnels that have similar delay guarantees. As described above, in such cases it may be more bandwidth efficient to bundle these tunnels together. In general, the traffic pattern may not match the one initially used to partition the tunnel, so the tunnel partition may have to be changed over time to efficiently use the available bandwidth. As such, the tunnel tuning procedure may result in tunnel re-assignment of some of the admitted end-to-end RSVP sessions.

The traffic profile is still described by a set of vectors ($b_i$, $R_i$, $S_i$), which is recorded by the TDP. However, unlike the example described earlier, the delay guarantee value is computed differently.

Since the tunnel has advertised a delay value $d^T$, for each session i, it must guarantee delay $d^T+S_i^0$, where $0 \leq S_i^0 \leq S_i$ is the slack value the tunnel decided to use. The tunnel-tuning algorithm is similar to the tunnel configuration algorithm (shown above) except the way the delay is computed. The tunnel tuning algorithm (Tunnel_Tunning (b, R, $S^0$, N)) is:

1 Let
  $d_1 = d^T$;
2. Sort vectors ($R_i$, $b_i$, $d_i+S_i^0$) using $d_i+S_i^0$ as the key, where i1, . . . , N.
3. For each n=1, . . . , N, compute:

$$R_{1,n}^g = \frac{\sum_{i=1}^{n} b_i + C_{tot}^T}{d_1 + S_1^0 - D_{tot}^T} \quad \text{and} \quad R_{2,n}^g = \frac{\sum_{i=n+1}^{N} b_i + C_{tot}^T}{d_{n+1} + S_{n+1}^0 - D_{tot}^T}.$$

4. Find $n_0 = \arg \min \{R_{1,n_0}^g + R_{2,n_0}^g\}$
5. If $n_0 = 1$, a tunnel is configured with $d^T = d_1 + S_1^0$, $b^T = \sum_i^N b_i$, and
  $R^T = (b^T + C_{tot}^T)/(d^T - D_{tot}^T)$ and Tunnel_Tuning Stops.
6. If $n_0 > 1$, run
  Tunnel_Tuning (($b_1$, . . . , $b_{n_0-1}$), ($R_1$, . . . , $R_{n_0-1}$), ($S_1^0$, . . . , $S_{n_0-1}^0$), $n_0-1$) and
  Tunnel_Tuning (($b_{n_0}$, . . . , $b_N$), ($R_{n_0}$, . . . , $R_N$), ($S_{n_0}^0$, . . . , $S_N^0$), $N-n_0+1$).

Another significant factor that affects the protocol performance is the advertised tunnel delay value (the smallest one among all the tunnels). If this value is too large, then some receivers may find the delay intolerable so the RSVP session will fail. On the other hand, if this value is too small and receivers do not give slack terms (or the slacks are used up by the routers between TDP and the receivers), then this may result in excessive demand on the tunnel bandwidth.

To find the appropriate advertised delay value, the TDP starts with a small advertised value and gradually increase it (again on a much longer time scale than dynamic adjustment) until there is a significant increase in the failed RSVP sessions.

As can be seen from the above, a new RSVP-based tunnel protocol has been described with the following distinct features.

The TDP makes the decisions on which end-to-end session is assigned to which tunnel based on the parameters of the tunnels and the end-to-end RESV messages from the receivers.

The TDP advertises a single delay value for all the tunnels between the TSP and the TDP. This makes the protocol simple and scalable.

Based on the traffic profile, the TDP partitions the tunnels to efficiently use bandwidth.

The TDP adjust the tunnels in response to the traffic dynamics.

The TDP tunes the tunnel on a longer time scale to improve the protocol performance.

If C and D are unknown functions of some parameters in TSPEC, multiple TSPEC messages with different parameter values can be sent and the functions can then be estimated by interpolation.

The first feature makes the protocol consistent with the receiver-driven nature of RSVP, and the remaining items make the protocol simple, scalable, flexible, and yet efficiently makes use of the tunnel bandwidth efficiently.

Figure 12:
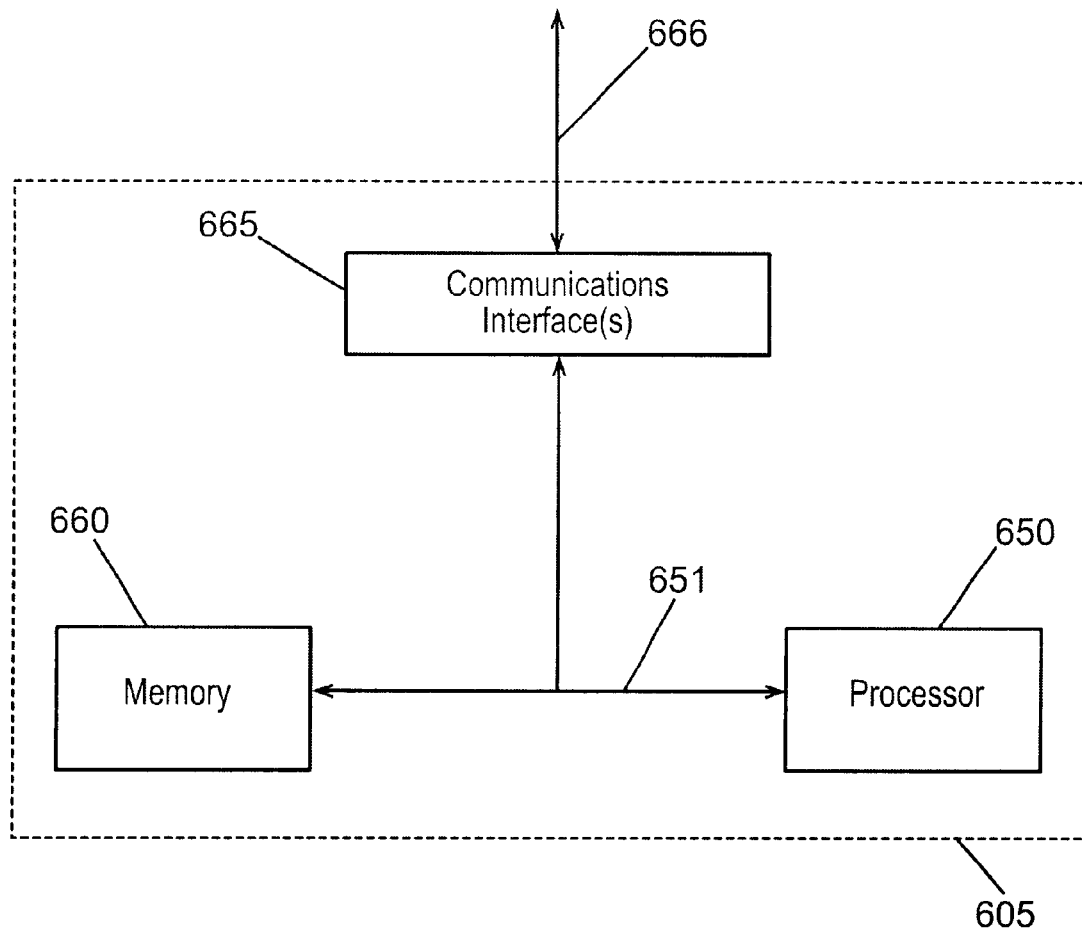
FIG. 12 shows an illustrative high-level block diagram of a Tunnel Destination Point.

Turning briefly to FIG. 12, a high-level block diagram of a representative TDP is shown in accordance with the principles of the invention. A TDP is a stored-program-control based processor architecture and includes processor 650, memory 660 (for storing program instructions and data, e.g., for communicating in accordance with the above-mentioned new RSVP-based tunnel protocol, etc.) and communications interface(s) 665 for coupling to one or more communication facilities as represented by path 666.

The foregoing merely illustrates the principles of the invention and it will thus be appreciated that those skilled in the art will be able to devise numerous alternative arrangements which, although not explicitly described herein, embody the principles of the invention and are within its spirit and scope. For example, the inventive concept can be used to provide a QoS guarantee on top of mobile IP services. In this case, an IP tunnel is set up from the home agent to the foreign agent, and such a tunnel uses RSVP, in accordance with the principles of the invention, to signal the QoS requirement for the aggregated traffic so that the QoS requirement for each individual flow is satisfied.

What is claimed:

1. A method for use in packet communication systems utilizing a Resource ReSerVation Protocol (RSVP), the method comprising the steps of:

creating an RSVP PATH message at a packet sender, said RSVP PATH message containing information on routing reservation-request messages from a packet receiver to the packet sender;

sending said RSVP PATH message from the packet sender through a Tunnel Source Point (TSP) to the packet receiver through a Tunnel Destination Point (TDP), wherein a plurality of RSVP tunnels that can each transport one or more packet flows exist between the TSP and the TDP;

creating an RSVP RESV message at the packet receiver, said RSVP RESV message containing parameters for a proposed RSVP tunnel that would allow a set of aggregated individual packet flows to travel within a given Quality of Service (QoS) through said proposed RSVP tunnel;

sending said RSVP RESV message from the packet receiver to the TDP;

determining at the TDP an actual RSVP tunnel from the existing set of RSVP tunnels that is sufficient to satisfy the parameters contained within the RVSP RESV message;

assigning said set of aggregated individual packet flows to said determined RSVP tunnel; creating a TUNNEL_BINDING object, said TUNNEL-BINDING object containing information on the assigned RSVP tunnel;

sending the RVSP RESV message and the TUNNEL_BINDING object from the TDP to the TSP;

sending the RVSP RESV message from the TSP to the packet sender; and using the assigned RSVP tunnel for said set of aggregated individual packet flows sent through the TSP.

2. The method of claim 1 further comprising the step of encapsulating the RVSP RESV message.

3. The method of claim 2 wherein the TUNNEL_BINDING object is attached to the encapsulated RSVP RESV message.

4. The method of claim 1 wherein the step of determining an actual RSVP tunnel is a function of a slack time value extracted from the received RSVP-based signaling and a minimum tunnel delay value.

5. The method of claim 1 wherein attached to the RSVP PATH is an AdSpec object, said AdSpec object containing a single delay value; and further comprising the step of advertising said single delay value prior to sending the RSVP RESV message from the packet receiver to the TDP.

6. The method of claim 1 further comprising the step of tuning established tunnels by adjusting at least one tunnel parameter such as burst size.

7. The method of claim 1 further comprising the step of tuning established tunnels by re-configuring the established tunnels and, if necessary, re-assigning end-to-end RSVP sessions.

8. An improved apparatus acting as a Tunnel Destination Point (TDP) serving in a packet communication system utilizing a Resource ReSerVation Protocol (RSVP) and communicating with a Tunnel Source Point (TSP) through a plurality of RSVP tunnels that exist between the TSP and the TDP, wherein each tunnel can transport one or more packet flows, the improved apparatus comprising:

a packet server for receiving an RSVP RESV message from a packet receiver, said RSVP RESV message containing parameters for a proposed RSVP tunnel that would allow a set of aggregated individual packet flows to travel within a given Quality of Service (QoS) through said proposed RSVP tunnel;

said packet server determining an actual RSVP tunnel from the existing set of RSVP tunnels that is sufficient to satisfy the parameters contained within the RVSP RESV message;

said packet server assigning said set of aggregated individual packet flows to said determined RSVP tunnel;

said packet server creating a TUNNEL_BINDING object, said TUNNEL_BINDING object containing information on the assigned RSVP tunnel; and said packet server sending the RVSP RESV message and the TUNNEL_BINDING object to the TSP.

9. The improved apparatus of claim 8 wherein the packet server sends an encapsulated form of the RVSP RESV message.

10. The improved apparatus of claim 9 wherein the TUNNEL_BINDING object is attached to the encapsulated RSVP RESV message.

11. The improved apparatus of claim 8 wherein the packet server determines an actual RSVP tunnel as a function of a slack time value extracted from the received RSVP-based signaling and a minimum tunnel delay value.

12. The improved apparatus of claim 8 wherein the packet server attaches to the RSVP PATH an AdSpec object, said AdSpec object containing a single delay value; and said packet server adverting said single delay value prior to receiving the RSVP RESV message from the packet receiver.

13. The improved apparatus of claim 8 wherein the packet server tunes established tunnels by adjusting at least one tunnel parameter such as burst size.

14. The improved apparatus of claim 8 wherein the packet server tunes established tunnels by re-configuring the established tunnels and, if necessary, re-assigning end-to-end RSVP sessions.

* * * * *